(12) United States Patent
Matsuno et al.

(10) Patent No.: US 8,288,900 B2
(45) Date of Patent: Oct. 16, 2012

(54) STEPPING MOTOR

(75) Inventors: Takeshi Matsuno, Shizuoka (JP);
Yoshiya Yamamura, Shizuoka (JP);
Hiroaki Itahashi, Shizuoka (JP);
Shigeki Miyaji, Shizuoka (JP); Yukihiro Terada, Shizuoka (JP)

(73) Assignee: Minebea Co., Ltd., Nagano (JP)

( * ) Notice: Subject to any disclaimer, the term of this patent is extended or adjusted under 35 U.S.C. 154(b) by 194 days.

(21) Appl. No.: 12/845,112

(22) Filed: Jul. 28, 2010

(65) Prior Publication Data

US 2011/0043074 A1  Feb. 24, 2011

(30) Foreign Application Priority Data

Aug. 24, 2009  (JP) .................. 2009-192833

(51) Int. Cl.
*H02K 37/00*  (2006.01)

(52) U.S. Cl. ..................... 310/49.16; 310/257

(58) Field of Classification Search .... 310/49.01–49.55, 310/49 R, 156.66, 156.69, 156.71, 257
See application file for complete search history.

(56) References Cited

U.S. PATENT DOCUMENTS 5,962,947 A * 10/1999 Suzuki et al. ................ 310/257
6,201,324 B1 * 3/2001 Suzuki et al. ................ 310/57
2007/0262671 A1 * 11/2007 Enomoto et al. ............ 310/257
2008/0084127 A1  4/2008 Sekine et al.

FOREIGN PATENT DOCUMENTS

JP  9-233801 A  9/1997
JP  2006-311708 A  11/2006

* cited by examiner

*Primary Examiner* — Quyen Leung
*Assistant Examiner* — Thomas Truong
(74) *Attorney, Agent, or Firm* — Carrier Blackman & Associates, P.C.; William D. Blackman; Joseph P. Carrier

(57) ABSTRACT

A stepping motor includes a rotor assembly and a stator assembly including two stator units axially coupled to each other. The two stator units each include a pair of yokes which each include a base portion and a plurality of pole teeth extending from the base portion and which are disposed such that each of the pole teeth of one yoke and each of the pole teeth of the other yoke are arranged alternately in the circumferential direction. The pole teeth are shaped symmetric and each include a pair of slant sides inclined so as to become closer to each other with an increase of distance from the base portion, and the slant sides of adjacent pole teeth are located close to each other wherein a magnetic pole gap between the adjacent pole teeth pole teeth is about 0.2 times as large as the thickness of the pole teeth.

7 Claims, 4 Drawing Sheets

STEPPING MOTOR

BACKGROUND OF THE INVENTION

1. Field of the Invention

The present invention relates to a PM stepping motor and more particularly to a pole tooth structure of a PM stepping motor.

2. Description of the Related Art

A PM (permanent magnet) stepping motor provides a high rotational precision and therefore is used for various kinds of actuators. The PM stepping motor (hereinafter referred to simply as stepping motor) generally includes a circular cylindrical rotor magnet which has a plurality of magnetic poles magnetized circumferentially thereon and a pair of stator units which are axially coupled to each other and are disposed around the rotor magnet. Each of the stator units is structured such that two yokes (specifically inner and outer yokes) each having a plurality of pole teeth arranged circumferentially in a comb-like manner are disposed to axially oppose each other with their respective pole teeth meshing with each other and such that an exciter coil (stator coil) is attached around the intermeshing pole teeth.

The stepping motor structured as described above, when used as an actuator in, for example, an automobile air conditioner, is requested to be less-vibration (lower-noise). A stepping motor with suppressed vibration for use as an actuator in an automobile air conditioner is disclosed in, for example, Japanese Patent Application Laid-Open No. 2006-311708.

Referring to FIG. 6, in the stepping motor disclosed in Japanese Patent Application Laid-Open No. 2006-311708, a stator unit includes a yoke including a magnetic pole tooth (pole tooth) 144 which has a geometry defining upright sides 144a and 144b extending from a base portion 143 of the yoke so as to be perpendicular to the base portion 143, a top end side 144c, and slant sides 144d and 144e connecting respectively between the distal end of the upright side 144a and one end of the top end side 144c and between the distal end of the upright side 144b and the other of the top end side 144c, wherein the pole tooth 144 has a width A at the top end side 144c, a width B at the base portion 143 of the yoke, and a height H that is an axial direction distance measuring from the base portion 143 to the top end side 144c, and wherein the ratio of the width A to the width B is 65% or more and at the same time the ratio of the height H to the width B ranges from 90% to 110%.

When the geometry of the pole tooth 144 is defined as described above, the content of magnetic flux interlinked with the stator coil is adapted to be changed so that the waveform of induced voltage of the stator coil can be adjusted to thereby reduce generation of torque which triggers vibration. As a result, the vibration caused when the motor runs can be reliably suppressed and a very quiet stepping motor can be provided without taking conventional countermeasures such as usage of additional components in en electronic circuit and provision of an additional space for such components.

The stepping motor disclosed in Japanese Patent Application Laid-Open No. 2006-311708, however, is involved with dimensional constraints in the pole tooth 144, specifically such that the ratio of the width A (at the top end side 144c) to the width B (at the base portion 143 of the yoke) and the ratio of the height H to the width B are subject to constraint. That is to say, since the ratio of the height H to the width B is required to range from 90% to 110%, the pole tooth 144 has a substantially square shape in plan view, and consequently the height H of the pole tooth 144 cannot be arbitrarily increased when the width B is set to a predetermined value.

Under the circumstances described above, the upper limit of the surface area of the pole tooth 144, with which the magnetic flux from the stator coil or the rotor magnet is interlinked, is limited, and therefore the starting torque cannot be increased to exceed a certain value. If the width B at the base portion 143 of the yoke is increased in order to allow the height H to increase, then the diameter of the yoke must be inevitably increased, thus forcing the diameter of the motor to increase.

Also, in the pole tooth 144 of the stepping motor disclosed in Japanese Patent Application Laid-Open No. 2006-311708, the ratio of the width A at the top end side 144c to the width B at the base portion 143 must be 65% or more. Consequently, since the pole tooth 144 does not include a portion whose circumferential dimension (width) is small compared with a triangle-shaped pole tooth generally employed, the precision in determination of the rotational position of the motor may be deteriorated.

Further, when the yoke with the pole tooth 144 is produced by punching a planar magnetic material (refer to Paragraph [0016] of Japanese Patent Application Laid-Open No. 2006-311708), more waste is generated compared when the yoke with a triangle-shaped pole tooth is produced by punching.

Moreover, generally, detent torque is to be lowered in order to suppress vibration, but when the stepping motor is used in, for example, an automobile air conditioner, detent torque must be set to a reasonably high level of value for preventing it from happening that the stepping motor at a stop is caused to rotate due to wind pressure.

SUMMARY OF THE INVENTION

The present invention has been made in light of the problems described above, and it is a principal object to provide a stepping motor in which vibration is low and design freedom is increased.

In order to achieve the object described above, according to an aspect of the present invention, there is provided a stepping motor including: a rotor assembly including a magnet and rotatably disposed around the rotation axis as center; and a stator assembly disposed around the rotor assembly and including two stator units which are axially coupled to each other and which each include a pair of yokes and a winding to excite the pair of yokes, wherein the pair of yokes each include an annular ring shaped base portion and a plurality of pole teeth bent up from the inner circumference of the base portion and are disposed such that each of the pole teeth of one yoke and each of the pole teeth of the other yoke are arranged alternately in the circumferential direction, and in the stepping motor described above, each of the pole teeth of the pair of yokes includes a pair of slant sides which are inclined such that the width of the pole tooth decreases in accordance with an increase of distance from the base portion, and at least a part of the slant side of the one yoke is located close to at least a part of the slant side of the other yoke.

According to the stepping motor described above, since the two (pair of) yokes, specifically, inner and outer yokes to constitute each stator unit are disposed to opposed each other such that the slant side of each pole tooth of the inner yoke is located close to the slant side of the pole tooth of the outer yoke, the vibration of the stepping motor can be suppressed. Also, since the pole tooth is not so much subject to geometrical constraint as the conventional art, the surface area of the pole tooth can be increased without increasing the diameter of the yokes and so of the stepping motor, which enables vibration to be reduced and at the same time starting torque to be increased in the stepping motor.

In the aspect of the present invention, each of the pole teeth may further include a pair of upright sides which extend from the base portion of the yoke in parallel to each other thereby constituting a proximal segment with a constant width, wherein the pair of slant sides constitute a distal segment which extends from the proximal segment so as to become narrower in accordance with an increase in distance from the proximal segment.

With the structure described above, since each pole tooth includes the proximal segment with a constant width and the distal segment whose width decreases with an increase of distance from the proximal segment, two adjacent and opposing pole teeth are disposed such respective distal segments are located close to each other while the proximal segment of one pole tooth is prevented from being located close to any part of another pole tooth adjacent to the one pole tooth. That is to say, if the proximal segment is provided, the dimension of parts of two adjacent and opposing pole teeth located close to each other can be reduced and thereby detent torque can be increased while vibration is suppressed. Also, the dimension of the mutually opposing parts of the pole teeth can be arbitrarily changed by varying the width of the proximal segments, whereby detent torque can be appropriately controlled.

In the aspect of the present invention, the ratio of the dimension of mutually opposing parts of the slant sides with respect to the maximum possible dimension of the slant sides may preferably range from 0.2 to 0.8

DETAILED DESCRIPTION OF THE INVENTION

Exemplary embodiments of the present invention will hereinafter be described with reference to the accompanying drawings.

Figure 1:
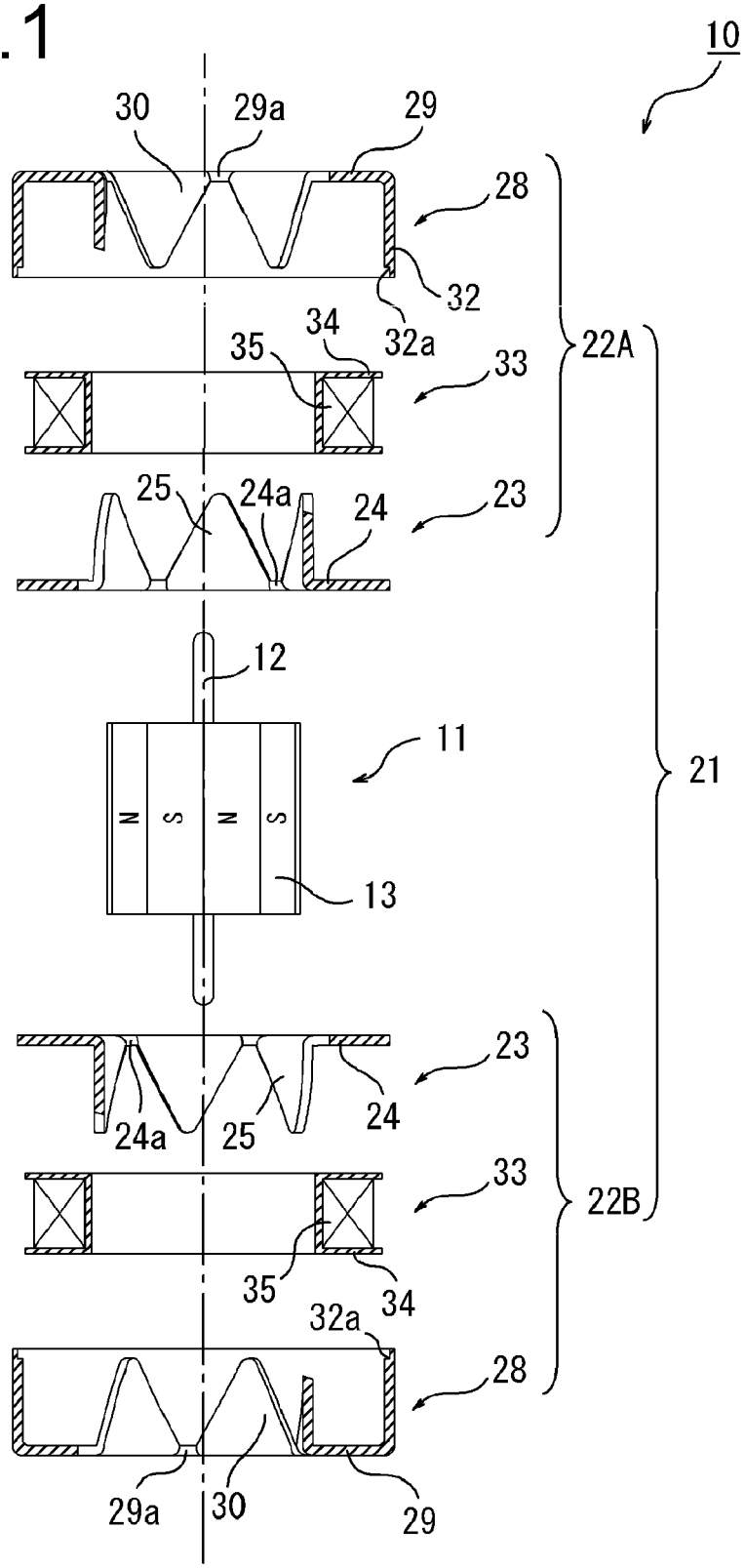
FIG. 1 is an exploded axial cross sectional view of a stepping motor according to a first embodiment of the present invention.

Referring to FIG. 1, a stepping motor 10 according to a first embodiment of the present invention includes a rotor assembly 11 having a circular cylindrical shape and defining a rotation axis (shaft) at its center, and a stator assembly 21 having a circular annular cylindrical shape and disposed around the rotor assembly 11.

The rotor assembly 11 includes a rotary shaft 12 made of a round metal bar, and a ring magnet 13 (ferrite bonded magnet in the present embodiment) circumferentially magnetized with a plurality (ten in the present embodiment) of magnetic poles and fixedly attached to the outer circumference of the rotary shaft 12. The rotary shaft 12 is rotatably supported by a pair of bearings (not shown).

The stator assembly 21 includes a pair of stator units 22A (first stator unit) and 22B (second stator unit) having a cylindrical annular shape and disposed coaxially with each other around the magnet 13 with a certain amount of air gap from the magnet 13. The first stator unit 22A (shown in the upper side in the figure) and the second stator unit 22B (shown in the lower side in the figure) have basically the same structure, wherein the first and second stator units 22A and 22B are axially coupled to each other in an axially symmetrical manner such that respective pole teeth (to be described later) circumferentially are shifted from each other (by an electrical angle of 90 degrees in terms of phase difference). The first and second stator units 22A and 22B will be referred to collectively as stator unit 22.

Each of the first and second stator units 22A and 22B includes a pair of yokes 23 (inner yoke) and 28 (outer yoke) disposed along the axial direction, and a coil portion 33 to excite the pair of yokes 23 and 28. When the first and second stator units 22A and 22B are axially coupled to each other as described above, the stator assembly 21 is formed, wherein respective inner yokes 23 are brought into contact with each other so as to be located axially centrally and respective outer yokes 28 are located at both axial ends.

The inner yoke 23 is made of a soft magnetic material (magnetic steel sheet in the present embodiment) and has a ring-shaped structure which includes a base portion 24 (inner yoke base portion) having an annular ring shape and disposed orthogonal to the rotation axis, and a plurality (five equal to half of the number of the magnetic poles of the magnet 13 in the present embodiment) of pole teeth 25 (inner yoke pole teeth) bent up from an inner circumference 24a of the base portion 24 so as to extend axially outwardly. The plurality of pole teeth 25 are arranged equidistantly from one another in a comb-like manner along the inner circumference 24a of the base portion 24.

Figure 2:
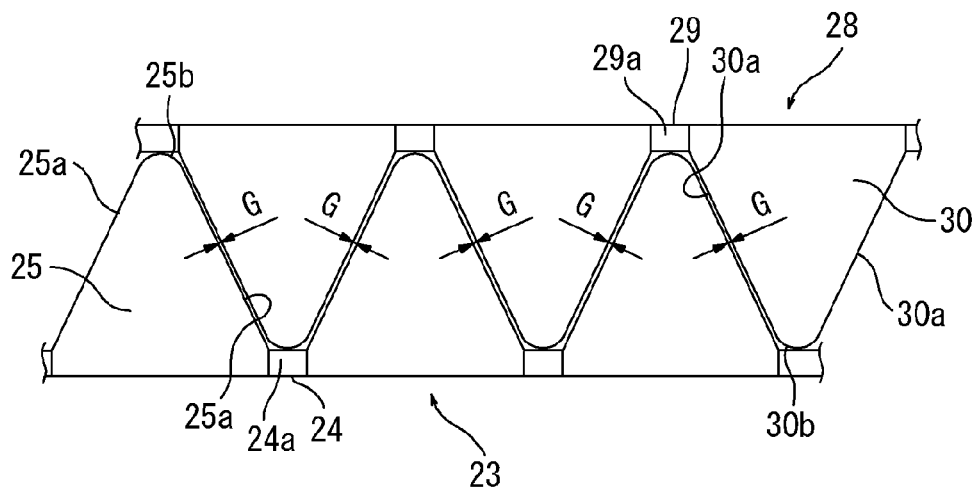
FIG. 2 is an enlarged development view of a portion of a pair of yokes of the stepping motor of FIG. 1.

As shown in FIG. 2, each of the pole teeth 25 in developed plan view has a triangular shape that is symmetric with respect to the direction of the rotation axis thus defining an isosceles triangle. Specifically, the pole tooth 25 is shaped so as to define a pair of slant sides 25a inclined to become closer to the symmetry center line with an increase of distance from the base portion 24 toward the vertex of the triangle, and a round apex 25b having in plan view an arced shape and adapted to connect between respective distal ends of the pair of slant sides 25a. The inclination angle of the slant side 25a is 55 degrees in the present embodiment.

On the other hand, referring again to FIG. 1, the outer yoke 28 is made of a soft magnetic material (magnetic steel sheet in the present embodiment) and has a cup-shaped structure which includes a base portion 29 (outer yoke base portion) having an annular ring shape and disposed orthogonal to the rotation axis, a plurality (five which is equal to the number of the inner yoke pole teeth 25) of pole teeth 30 (outer yoke pole teeth) bent up from an inner circumference 29a of the base portion 29 so as to extend axially inwardly, and an outer circumferential wall 32 bent up from an outer circumference of the base portion 29 so as to extend axially inwardly with a predetermined distance kept from the pole teeth 30.

The plurality of pole teeth 30 are arranged equidistantly from one another in a comb-like manner along the inner circumference 29a of the base portion 29. The pole teeth 30 of the outer yoke 28 have the same shape and thickness as the pole teeth 25 of the inner yoke 23. That is to say, the pole teeth 30 is shaped so as to define a pair of slant sides 30a inclined to become closer to the symmetry center with an increase of distance from the base portion 29 toward the apex of the triangle, and a round apex 30b to connect between respective distal ends of the pair of slant sides 30a.

The outer yoke 28 is coupled to the inner yoke 23 in a coaxial manner such that the plurality of pole teeth 30 mesh with the plurality of pole teeth 25, specifically such that the plurality of pole teeth 25 and the plurality of pole teeth 30 are disposed to complement each other in the same virtual circumferential plane. The magnet 13 of the rotor assembly 11 is disposed coaxially inside the virtual circumferential plane. The inner and outer yokes 23 and 28 are positioned with respect to each other in such a manner that an outer circumference of the base portion 24 of the inner yoke 23 is fitted to a positioning recess 32a formed at the outer circumferential wall 32 of the outer yoke 28.

The inner yoke 23 and the outer yoke 28 which are positioned to oppose each other are arranged such that one slant side 25a of the pole tooth 25 is close to and parallel to one slant side 30a of the pole teeth 30, wherein an air gap G (hereinafter referred to as "magnetic pole gap") defined between the slant side 25a of the inner yoke 23 and the slant side 30a of the outer yoke 28 is about 0.2 times as large as the thickness of the pole teeth 25 and 30. In this connection, the pole teeth 25 and 30 both have a thickness of 0.8 mm in the present embodiment.

Each of the pair of coil portions 33 includes an annular cylindrical bobbin 34 having respective flanges at axial ends thereof, and a winding 35 disposed around the bobbin 34. The coil portion 33 is disposed in an annular space formed between the outer circumferential wall 32 of the outer yoke 28 and the virtual circumferential plane formed by the pole teeth 25 and 30.

In the stepping motor 10 described above, when a current of a predetermined value is applied to the pair of windings 35, the rotor assembly 11 (the rotary shaft 12) can be rotated by a predetermined angle in a predetermined direction. Also, since the inner yoke 23 and the outer yoke 28 are arranged such that the slant sides 25a of the pole teeth 25 of the inner yoke 23 are close to the slant sides 30a of the pole tooth 30 of the outer yoke 28, anti-vibration characteristics can be improved thus reducing noises.

The anti-vibration characteristics improvement will now be described with reference to the embodiment.

Figure 3:
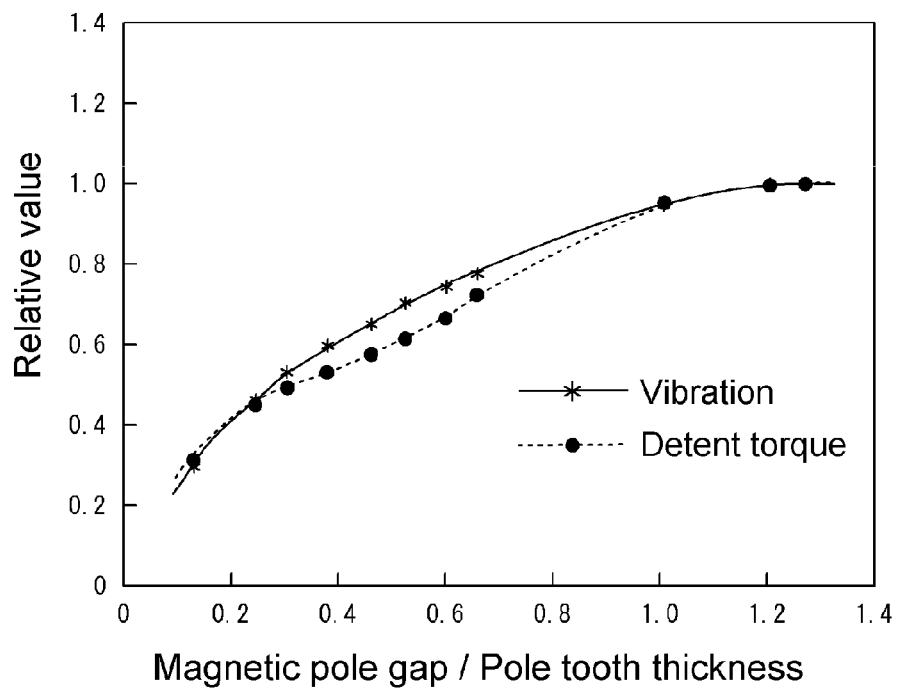
FIG. 3 is a graph of relationship of vibration and detent torque as a function of a gap between adjacent pole teeth of the pair of yokes of FIG. 2.

FIG. 3 shows graphically the influence the magnetic pole gap G has on the anti-vibration characteristics. In the graph, the vertical axis refers to a relative value of the magnitude of vibration generated circumferentially when the stepping motor rotates in a definite direction. Also, the horizontal axis shows a figure obtained by dividing the magnetic pole gap G over the thickness (0.8 mm) of the pole teeth 25/30.

As shown from FIG. 3, the vibration becomes smaller with a decrease in figure of "magnetic pole gap G/pole tooth thickness" in the range below 1.2. Accordingly, it is preferable that the slant sides of the adjacent pole teeth are set practicably close to each other in a nearly contacting state for the purpose of possibly minimizing the vibration in order to achieve noise reduction. However, when the yokes with pole teeth are produced by a punching method, there is concern that it is difficult for the slant sides of the adjacent magnetic poles to be set so closely as to nearly contact each other in a stable manner because of its processing accuracy. Under such circumstances, when the yokes with pole teeth are produced by a punching method, it is practically preferable that the slant sides of the adjacent pole teeth are disposed closely such that the figure obtained by dividing the magnetic pole gap G over the pole tooth thickness is 0.25 or less, more specifically between 0.15 and 0.25, whereby vibration reduction effect can be obtained substantially.

It is also shown from FIG. 3 that detent torque becomes smaller with a decrease of the magnetic pole gap G. Therefore, by narrowing the magnetic pole gap G, detent torque as well as vibration can be reduced. Thus, detent torque can be set arbitrarily at an appropriate value by means of controlling the magnetic pole gap G.

A stepping motor according to a second embodiment of the present invention will be described with reference to FIGS. 4 and 5. The stepping motor according to the second embodiment differs from the stepping motor 10 according to the first embodiment in pole tooth shape of inner and outer yokes, and description will be focused on the difference of pole tooth shape therebetween with explanation of other details omitted as appropriate.

Figure 4:
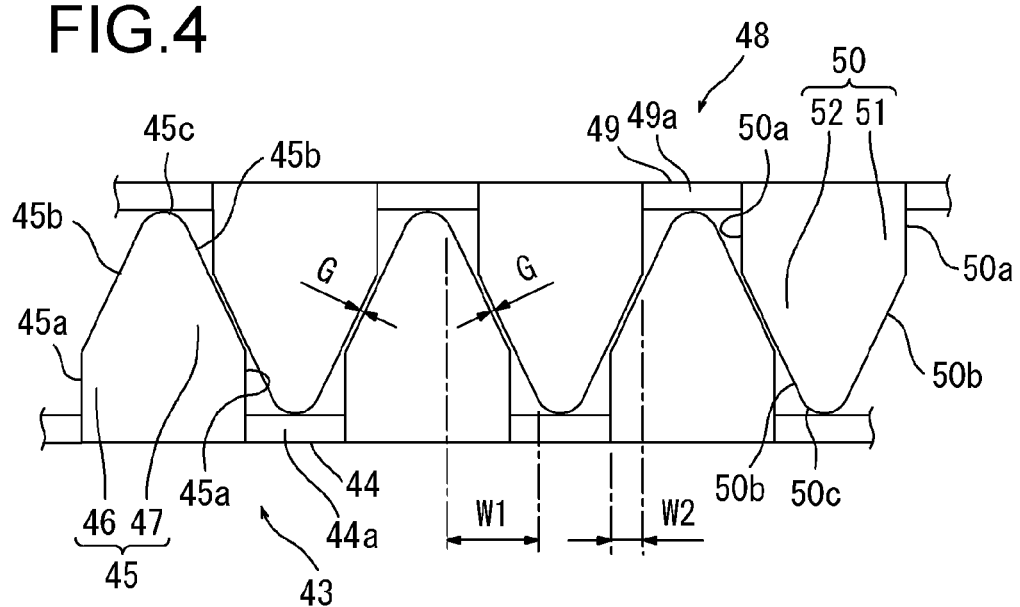
FIG. 4 is an enlarged development view of a portion of a pair of yokes of a stepping motor according to a second embodiment of the present invention.
Figure 5:
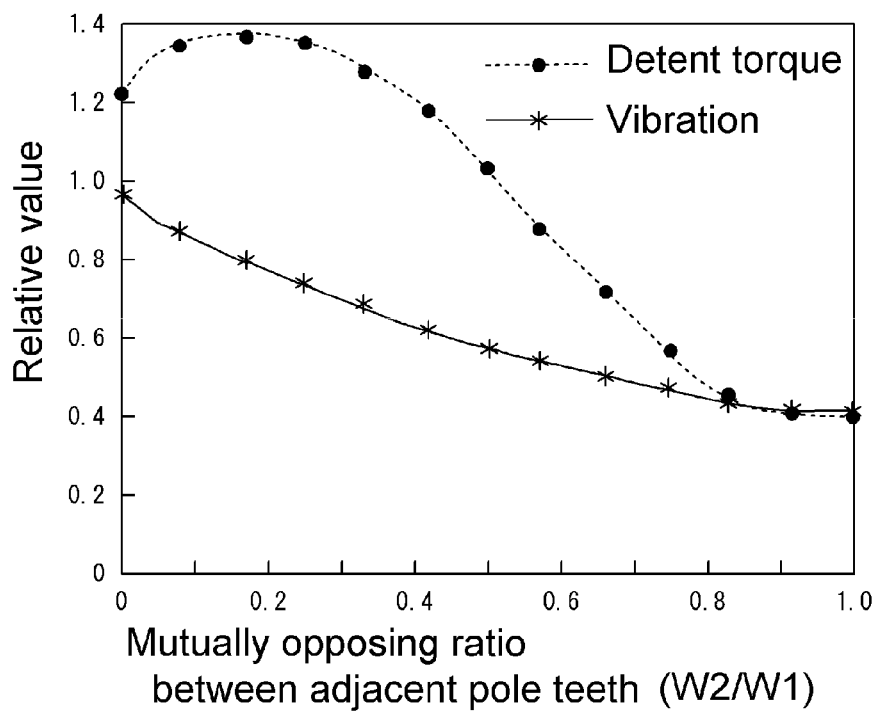
FIG. 5 is a graph of relationship of vibration and detent torque as a function of an opposing ratio between adjacent pole teeth of the pair of yokes of FIG. 4.
Figure 6:
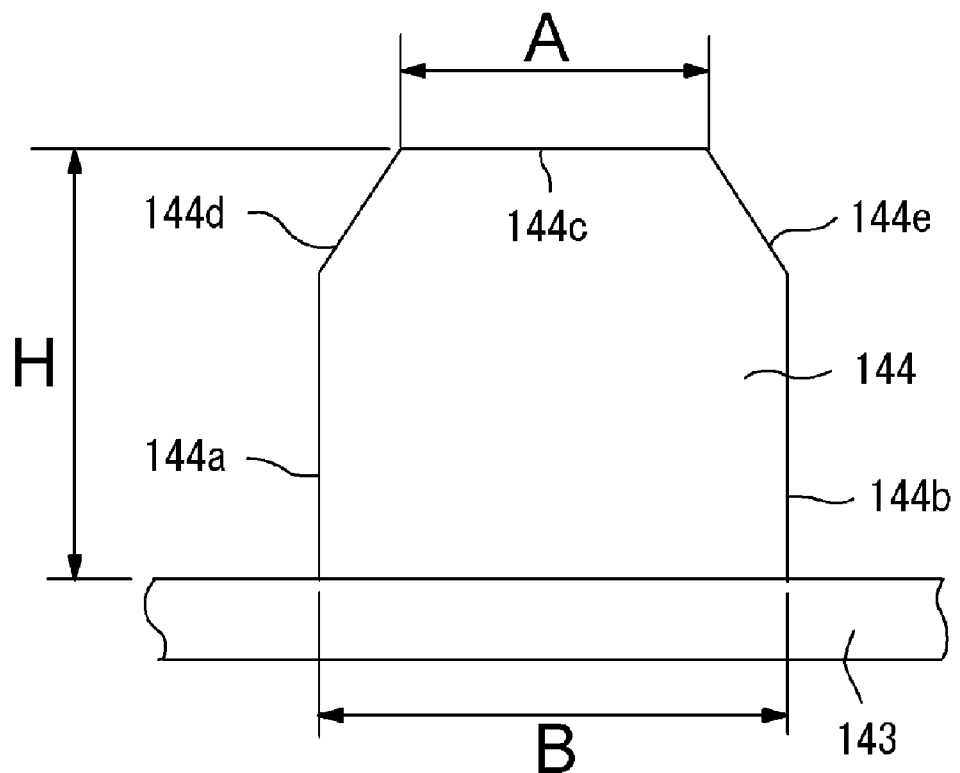
FIG. 6 is en enlarged plan view of a pole tooth of a yoke of a conventional stepping motor.

The stepping motor according to the second embodiment includes two pairs (only one pair is partly shown in the figure) of inner and outer yokes 43 and 48 which are shown in FIG. 4. Each inner yoke 43 includes a base portion 44, and a plurality of pole teeth 45 which are bent up from the base portion 44 and have in developed plan view a pentagonal shape that is symmetric with respect to the direction of the rotation axis. Specifically, the pole tooth 45 is shaped so as to define a pair of upright sides 45a extending in parallel to each other from the base portion 44, a pair of slant sides 45b inclined to become closer to the symmetry center line with an increase of distance from the base portion 44 toward the outer yoke 48, and a round apex 45c having in plan view an arced shape so as to connect between respective distal ends of the pair of slant sides 45b. That is to say, each of the pole teeth 45 includes a proximal segment 46 which extends from the base portion 44 and has a constant width, and a distal segment 47 which extends further from the proximal segment 46 and has a width narrowing with an increase of distance from the proximal segment 46 toward the round apex 45c.

Each outer yoke 48 includes a base portion 49, and a plurality of pole teeth 50 which are bent up from the base portion 49 and have the same shape and thickness as the pole teeth 45 of the inner yoke 43. Specifically, the pole tooth 50 is shaped so as to define a pair of upright sides 50a extending in parallel to each other from the base portion 49, a pair of slant sides 50b inclined to become closer to the symmetry center line with an increase of distance from the base portion 49 toward the outer yoke 43, and a round apex 50c having in plan view an arced shape so as to connect between respective distal ends of the pair of slant sides 50b. That is to say, each of the pole teeth 50 includes a proximal segment 51 which extends from the base portion 49 and has a constant width, and a distal segment 52 which extends further from the proximal segment 51 and has a width narrowing with an increase of distance from the proximal segment 51 toward the round apex 50c.

When the pole tooth 45 of the inner yoke 43 and the pole tooth 50 of the outer yoke 48 are formed as described above, a part (located toward the upright side 45a) of the slant side 45b of the pole tooth 45 and a part (located toward the upright side 50a) of the slant side 50b of the pole tooth 50 are adapted to oppose each other with a parallel gap therebetween, wherein the circumferential direction dimension of the mutually opposing parts of the pole teeth 45 and 50 is indicated by W2 shown in FIG. 4.

Specifically, the inner yoke 43 and the outer yoke 48 are disposed such that one slant side 45b of the pole tooth 45 and one slant side 50b of the pole tooth 50 are close to each other, wherein an air gap (magnetic pole gap G) between the slant side 45b of the pole tooth 45 and the slant side 50b of the pole tooth 50 is about 0.2 times as large as the thickness of the pole teeth 45 and 50 in the present embodiment. The pole teeth 45 and 50 in the second embodiment both have a thickness of 0.8 mm as in the first embodiment.

Thus, also in the second embodiment, the inner yoke 43 and the outer yoke 45 are disposed such that the slant side 45b of the pole tooth 45 is partly close to the slant side 50b of the pole tooth 50, whereby anti-vibration characteristics can be improved. In addition, in the second embodiment, since the pole teeth 45 and 50 respectively include the proximal segments 46 and 51 constituted by the upright sides 45a and 50a, the mutually opposing parts of the pole teeth 45 and 50 located close to each other have a decreased dimension compared to in the first embodiment. As a result, detent torque can be increased while low vibration characteristics are kept.

Also, the dimension of the mutually opposing parts of the pole teeth 45 and 50 can be arbitrarily changed by varying the width of the proximal segments 46 and 51, whereby detent torque can be appropriately controlled.

The advantageous effect resulting from providing the pole teeth 45 and 50 with the proximal segments 46 and 51 will be described with reference to the second embodiment.

FIG. 4 shows graphically the influence imposed on the vibration characteristics by a mutually opposing ratio between adjacent pole teeth, which is represented by "W2/W1", where W1 is a maximum possible circumferential direction dimension (dimension projected on the base portions 44 and 49) of the slant sides 45b and 50b which is achieved when the upright sides 45a and 50a are not provided thus eliminating the proximal segments 46 and 51 (refer to FIG. 4), and where W2 is, as described earlier, the circumferential direction dimension of the mutually opposing parts of the pole teeth 45 and 50. Accordingly, in the case of the pole teeth 25 and 30 of the stepping motor 10 according to the first embodiment, the mutually opposing ratio "W2/W1" is calculated as 1 (one). Since the slant sides 45b and 50b have a given inclination angle, the mutually opposing ratio "W2/W1" refers to a ratio of the dimension of the mutually opposing parts of the slant sides 45b and 50b with respect to the maximum possible dimension of the slant sides 45b and 50b. In this connection, the value obtained by dividing the magnetic pole gap G over the pole tooth thickness is set at about 0.2.

As shown from FIG. 5, the vibration tends to increase gradually in accordance with the decreasing of the mutually opposing ratio "W2/W1" below 1 (one) but stays lower at every point of the mutually opposing ratio "W2/W1" compared to the conventional art using pole teeth having a triangular shape ("magnetic pole gap G/pole tooth thickness" is 1.2 or more). On the other hand, detent torque starts to increase rapidly when the mutually opposing ratio "W2/W1" becomes below 0.8, then comes equal to that of the conventional art when the mutually opposing ratio "W2/W1" is at around 0.5, and reaches the maximum value (about 40% over the conventional art) when the mutually opposing ratio "W2/W1" is at around 0.2.

Thus, at the mutually opposing ratio "W2/W1" ranging between 0.2 and 0.8, detent torque can be arbitrarily controlled while the vibration is kept low, more specifically such that both lower vibration and higher detent torque can be achieved compared to the conventional art by setting the mutually opposing ratio "W2/W1" to range between 0.2 and 0.5, and moreover that still lower vibration and also a conventional level of detent torque can be achieved by setting the mutually opposing ratio "W2/W1" to range between 0.4 and 0.6.

Also, in the second embodiment, when the value obtained by dividing the magnetic pole gap G over the pole tooth thickness is set at about 0.25 or below, preferably set to range between 0.15 and 0.25, the advantageous effects described above can be stably achieved.

While the present invention has been described with respect to specific embodiments, it is to be understood that the present invention is by no means limited thereto but encompasses various modifications and combinations without departing from the spirit and scope of the present invention.

For example, in the embodiments described above, the pole teeth 25 and 30 (45 and 50) are disposed and located close to each other with a predetermined gap provide therebetween, but the present invention is not limited to such disposition arrangement. If the inner and outer yokes 23 and 28 (43 and 48) including the pole teeth 25 and 30 (45 and 50) can be precisely produced by a processing method other than a punching method, then the slant sides 25a and 30a (45b and 50b) may be disposed in contact with each other. That is to say, in the present invention, the slant sides 25a and 30a (45b and 50b) may oppose each other with a slight gap therebetween, or with no gap therebetween thus making contact with each other.

Also, in the embodiments described above, the pole teeth 25 and 30 (45 and 50) are shaped to be symmetric with respect to the direction of the rotation axis, but present invention is not limited to such geometric arrangement and the pole teeth may be arbitrarily shaped as long as the slant sides of adjacent pole teeth can be at least partly close to each other. For example, the pair of upright sides 45a (50a) in the second embodiment may alternatively have respective different dimensions, in which case the dimension of one upright side 45a (50a) may be reduced to 0 (zero) thus eliminating the one upright side 45a (50a).

Moreover, the pair of upright sides 45a (50a) do not have to be exactly upright and parallel to each other and may be inclined with respect to the direction of the rotation axis at an angle smaller than the inclination angle of the slant sides 45b (50b) as long as "magnetic pole gap G/pole tooth thickness" is set at 1.2 or more. Also, the upright sides 45a (50a) do not have to be straight and may be, for example, curved.

What is claimed is:

1. A stepping motor comprising:
   a rotor assembly comprising a magnet and rotatably disposed around a rotation axis as center; and
   a stator assembly disposed around the rotor assembly and comprising two stator units which are axially coupled to each other and which each comprise a pair of yokes including a first yoke and a second yoke, respectively, and a winding to excite the pair of yokes,
   wherein the pair of yokes each comprise an annular ring shaped base portion and a plurality of pole teeth bent up from an inner circumference of the base portion and disposed such that the pole teeth of the first yoke and the pole teeth of the second yoke are arranged alternately in a circumferential direction,
   wherein each of the pole teeth of the pair of yokes comprises a pair of slant sides which are inclined such that a width of the pole tooth decreases in accordance with an increase of distance from the base portion, and wherein at least a part of the slant side of the first yoke is located close to at least a part of the slant side of the second yoke, and
   wherein a ratio of a dimension of mutually opposing parts of the slant sides with respect to a maximum possible dimension of the slant sides ranges from 0.2 to 0.8.

2. A stepping motor according to claim 1, wherein each of the pole teeth further comprises a pair of upright sides which extend from the base portion of the yoke in parallel to each other thereby constituting a proximal segment with a constant width, and wherein the pair of slant sides constitute a distal segment which extends from the proximal segment so as to become narrower in accordance with an increase of distance from the proximal segment.

3. A stepping motor according to claim 1, wherein a gap is defined between at least a part of the slant side of the pole teeth of the first yoke and at least a part of the slant side of an adjacent pole tooth of the second yoke, the gap having a width which is less than or equal to one fourth of a thickness of the pole teeth.

4. A stepping motor according to claim 3, wherein the width of the gap is greater than or equal to fifteen percent of the thickness of the pole teeth.

5. A stepping motor according to claim 1, wherein the ratio is in a range from 0.2 to 0.5.

6. A stepping motor according to claim 1, wherein the ratio is in a range from 0.4 to 0.6.

7. A stepping motor according to claim 1, wherein at least a part of the slant side of a pole tooth of the first yoke opposes and is parallel to at least a part of the slant side of a corresponding pole tooth of the second yoke.

* * * * *